(12) United States Patent
Parsche

(10) Patent No.: US 8,763,691 B2
(45) Date of Patent: Jul. 1, 2014

(54) APPARATUS AND METHOD FOR HEATING OF HYDROCARBON DEPOSITS BY AXIAL RF COUPLER

(75) Inventor: Francis Eugene Parsche, Palm Bay, FL (US)

(73) Assignee: Harris Corporation, Melbourne, FL (US)

( * ) Notice: Subject to any disclaimer, the term of this patent is extended or adjusted under 35 U.S.C. 154(b) by 558 days.

(21) Appl. No.: 12/839,927

(22) Filed: Jul. 20, 2010

(65) Prior Publication Data

US 2012/0018140 A1    Jan. 26, 2012

(51) Int. Cl.
    *E21B 43/24*    (2006.01)
(52) U.S. Cl.
    USPC .............................. 166/248; 166/60; 166/302
(58) Field of Classification Search
    USPC .............. 166/60, 61, 66.5, 302, 248; 392/304
    See application file for complete search history.

(56) References Cited

U.S. PATENT DOCUMENTS

| | | |
|---|---|---|
| 2,371,459 A | 3/1945 | Mittelmann |
| 2,685,930 A | 8/1954 | Albaugh |
| 3,497,005 A | 2/1970 | Pelopsky |
| 3,848,671 A | 11/1974 | Kern |
| 3,954,140 A | 5/1976 | Hendrick |
| 3,988,036 A | 10/1976 | Fisher |
| 3,991,091 A | 11/1976 | Driscoll |
| 4,035,282 A | 7/1977 | Stuchberry et al. |
| 4,042,487 A | 8/1977 | Seguchi |
| 4,087,781 A | 5/1978 | Grossi et al. |
| 4,136,014 A | 1/1979 | Vermeulen et al. |
| 4,140,179 A | 2/1979 | Kasevich et al. |
| 4,140,180 A | 2/1979 | Bridges et al. |
| 4,144,935 A | 3/1979 | Bridges et al. |
| 4,146,125 A | 3/1979 | Sanford et al. |
| 4,196,329 A | 4/1980 | Rowland et al. |

(Continued)

FOREIGN PATENT DOCUMENTS

| | | |
|---|---|---|
| CA | 1199573 A1 | 1/1986 |
| CA | 2678473 | 8/2009 |

(Continued)

OTHER PUBLICATIONS

PCT Notification of Transmittal of the International Search Report and The Written Opinion of the International Searching Authority, or the Declaration, in PCT/US2010/025761, dated Feb. 9, 2011.

(Continued)

*Primary Examiner* — David Andrews
(74) *Attorney, Agent, or Firm* — Allen, Dyer, Doppelt, Milbrath & Gilchrist, P.A.

(57) ABSTRACT

An apparatus for heating a hydrocarbon deposit that is susceptible to RF heating by coupling a linear conductive element that extends into the material to a source of RF power. The apparatus includes a source of RF power connected to driving winding that extends around a magnetic core loop and the magnetic core loop extends around the RF conductive linear element. One or more apparatus may be used to couple RF energy to conductive elements that extend into a hydrocarbon deposit to achieve a desired RF current within the element. RF energy may be coupled to conductive elements that are adjacent to each other within a hydrocarbon deposit to create a desired region of heating within the hydrocarbon deposit. The magnetic core loop may start and stop the RF energy to position heating.

15 Claims, 14 Drawing Sheets

(56) References Cited

U.S. PATENT DOCUMENTS

| | | |
|---|---|---|
| 4,295,880 A | 10/1981 | Horner |
| 4,300,219 A | 11/1981 | Joyal |
| 4,301,865 A | 11/1981 | Kasevich et al. |
| 4,303,021 A | 12/1981 | Bourlier et al. |
| 4,328,324 A | 5/1982 | Kock |
| 4,373,581 A | 2/1983 | Toellner |
| 4,396,062 A | 8/1983 | Iskander |
| 4,404,123 A | 9/1983 | Chu |
| 4,410,216 A | 10/1983 | Allen |
| 4,425,227 A | 1/1984 | Smith |
| 4,449,585 A | 5/1984 | Bridges et al. |
| 4,456,065 A | 6/1984 | Heim |
| 4,457,365 A | 7/1984 | Kasevich et al. |
| 4,470,459 A | 9/1984 | Copland |
| 4,485,869 A | 12/1984 | Sresty |
| 4,487,257 A | 12/1984 | Dauphine |
| 4,508,168 A | 4/1985 | Heeren |
| 4,514,305 A | 4/1985 | Filby |
| 4,524,827 A | 6/1985 | Bridges |
| 4,531,468 A | 7/1985 | Simon |
| 4,583,586 A | 4/1986 | Fujimoto et al. |
| 4,620,593 A | 11/1986 | Haagensen |
| 4,622,496 A | 11/1986 | Dattili |
| 4,645,585 A | 2/1987 | White |
| 4,678,034 A | 7/1987 | Eastlund |
| 4,703,433 A | 10/1987 | Sharrit |
| 4,790,375 A | 12/1988 | Bridges |
| 4,817,711 A | 4/1989 | Jeambey |
| 4,882,984 A | 11/1989 | Eves, II |
| 4,892,782 A | 1/1990 | Fisher et al. |
| 5,046,559 A | 9/1991 | Glandt |
| 5,055,180 A | 10/1991 | Klaila |
| 5,065,819 A | 11/1991 | Kasevich |
| 5,082,054 A | 1/1992 | Kiamanesh |
| 5,136,249 A | 8/1992 | White |
| 5,199,488 A | 4/1993 | Kasevich |
| 5,233,306 A | 8/1993 | Misra |
| 5,236,039 A * | 8/1993 | Edelstein et al. ............. 166/248 |
| 5,251,700 A | 10/1993 | Nelson |
| 5,293,936 A | 3/1994 | Bridges |
| 5,304,767 A | 4/1994 | McGaffigan |
| 5,315,561 A | 5/1994 | Grossi |
| 5,370,477 A | 12/1994 | Bunin |
| 5,378,879 A | 1/1995 | Monovoukas |
| 5,506,592 A | 4/1996 | MacDonald |
| 5,523,750 A * | 6/1996 | de Vall ..................... 340/870.31 |
| 5,582,854 A | 12/1996 | Nosaka |
| 5,621,844 A | 4/1997 | Bridges |
| 5,631,562 A | 5/1997 | Cram |
| 5,746,909 A | 5/1998 | Calta |
| 5,910,287 A | 6/1999 | Cassin |
| 5,923,299 A | 7/1999 | Brown et al. |
| 5,978,799 A * | 11/1999 | Hirsch ................... 1/1 |
| 6,045,648 A | 4/2000 | Palmgren et al. |
| 6,046,464 A | 4/2000 | Schetzina |
| 6,055,213 A | 4/2000 | Rubbo |
| 6,063,338 A | 5/2000 | Pham |
| 6,097,262 A | 8/2000 | Combellack |
| 6,106,895 A | 8/2000 | Usuki |
| 6,112,273 A | 8/2000 | Kau |
| 6,184,427 B1 | 2/2001 | Klepfer |
| 6,229,603 B1 | 5/2001 | Coassin |
| 6,232,114 B1 | 5/2001 | Coassin |
| 6,301,088 B1 | 10/2001 | Nakada |
| 6,348,679 B1 | 2/2002 | Ryan et al. |
| 6,353,706 B1 * | 3/2002 | Bridges ...................... 392/306 |
| 6,360,819 B1 | 3/2002 | Vinegar |
| 6,432,365 B1 | 8/2002 | Levin |
| 6,603,309 B2 | 8/2003 | Forgang |
| 6,613,678 B1 | 9/2003 | Sakaguchi |
| 6,614,059 B1 | 9/2003 | Ban et al. |
| 6,649,888 B2 | 11/2003 | Ryan et al. |
| 6,712,136 B2 | 3/2004 | de Rouffignac |
| 6,808,935 B2 | 10/2004 | Levin |
| 6,923,273 B2 | 8/2005 | Terry |
| 6,932,155 B2 | 8/2005 | Vinegar |
| 6,967,589 B1 | 11/2005 | Peters |
| 6,992,630 B2 | 1/2006 | Parsche |
| 7,046,584 B2 | 5/2006 | Sorrells |
| 7,079,081 B2 | 7/2006 | Parsche et al. |
| 7,091,460 B2 | 8/2006 | Kinzer |
| 7,109,457 B2 | 9/2006 | Kinzer |
| 7,115,847 B2 | 10/2006 | Kinzer |
| 7,147,057 B2 | 12/2006 | Steele |
| 7,172,038 B2 | 2/2007 | Terry |
| 7,205,947 B2 | 4/2007 | Parsche |
| 7,312,428 B2 | 12/2007 | Kinzer |
| 7,322,416 B2 | 1/2008 | Burris, II |
| 7,337,980 B2 | 3/2008 | Schaedel |
| 7,438,807 B2 | 10/2008 | Garner et al. |
| 7,441,597 B2 | 10/2008 | Kasevich |
| 7,461,693 B2 | 12/2008 | Considine et al. |
| 7,484,561 B2 | 2/2009 | Bridges |
| 7,562,708 B2 | 7/2009 | Cogliandro |
| 7,623,804 B2 | 11/2009 | Sone |
| 2002/0032534 A1 | 3/2002 | Regier |
| 2004/0031731 A1 | 2/2004 | Honeycutt |
| 2004/0084442 A1 | 5/2004 | Larovere |
| 2005/0199386 A1 | 9/2005 | Kinzer |
| 2005/0274513 A1 | 12/2005 | Schultz |
| 2006/0038083 A1 | 2/2006 | Criswell |
| 2007/0108202 A1 | 5/2007 | Kinzer |
| 2007/0131591 A1 | 6/2007 | Pringle |
| 2007/0137852 A1 | 6/2007 | Considine et al. |
| 2007/0137858 A1 | 6/2007 | Considine et al. |
| 2007/0187089 A1 | 8/2007 | Bridges |
| 2007/0261844 A1 | 11/2007 | Cogliandro et al. |
| 2008/0073079 A1 | 3/2008 | Tranquilla |
| 2008/0143330 A1 | 6/2008 | Madio |
| 2008/0297161 A1 | 12/2008 | Gorek |
| 2009/0009410 A1 | 1/2009 | Dolgin et al. |
| 2009/0242196 A1 | 10/2009 | Pao |

FOREIGN PATENT DOCUMENTS

| | | |
|---|---|---|
| DE | 10 2008 022176 A1 | 11/2009 |
| EP | 0 135 966 | 4/1985 |
| EP | 0418117 A1 | 3/1991 |
| EP | 0540425 | 5/1993 |
| EP | 0563999 A2 | 10/1993 |
| EP | 1106672 A1 | 6/2001 |
| FR | 1586066 A | 2/1970 |
| FR | 2925519 A1 | 6/2009 |
| JP | 56050119 A | 5/1981 |
| JP | 2246502 A | 10/1990 |
| JP | 3221668 | 9/1991 |
| WO | WO 2007/133461 | 11/2007 |
| WO | WO2008/011412 A2 | 1/2008 |
| WO | WO 2008/030337 | 3/2008 |
| WO | WO2008098850 A1 | 8/2008 |
| WO | WO2009027262 A1 | 8/2008 |
| WO | WO2009/114934 A1 | 9/2009 |

OTHER PUBLICATIONS

PCT Notification of Transmittal of the International Search Report and The Written Opinion of the International Searching Authority, or the Declaration, in PCT/US2010/057090, dated Mar. 3, 2011.

"Control of Hazardous Air Pollutants From Mobile Sources", U.S. Environmental Protection Agency, Mar. 29, 2006. p. 15853 (http://www.epa.gov/EPA-AIR/2006/March/Day-29/a2315b.htm).

Von Hippel, Arthur R., Dielectrics and Waves, Copyright 1954, Library of Congress Catalog Card No. 54-11020, Contents, pp. xi-xii; Chapter II, Section 17, "Polyatomic Molecules", pp. 150-155; Appendix C-E, pp. 273-277, New York, John Wiley and Sons.

United States Patent and Trademark Office, Non-final Office action issued in U.S. Appl. No. 12/396,247, dated Mar. 28, 2011.

United States Patent and Trademark Office, Non-final Office action issued in U.S. Appl. No. 12/396,284, dated Apr. 26, 2011.

Patent Cooperation Treaty, Notification of Transmittal of the International Search Report and The Written Opinion of the International Searching Authority, or the Declaration, in PCT/US2010/025808, dated Apr. 5, 2011.

(56) References Cited

OTHER PUBLICATIONS

Deutsch, C.V., McLennan, J.A., "The Steam Assisted Gravity Drainage (SAGD) Process," Guide to SAGD (Steam Assisted Gravity Drainage) Reservoir Characterization Using Geostatistics, Centre for Computational Statistics (CCG), Guidebook Series, 2005, vol., 3; p. 2, section 1.2, published by Centre for Computational Statistics, Edmonton, AB, Canada.
Marcuvitz, Nathan, Waveguide Handbook; 1986; Institution of Engineering and Technology, vol. 21 of IEE Electromagnetic Wave series, ISBN 0863410588, Chapter 1, pp. 1-54, published by Peter Peregrinus Ltd. on behalf of the Institution of Electrical Engineers, © 1986.
Marcuvitz, Nathan, Waveguide Handbook; 1986; Institution of Engineering and Technology, vol. 21 of IEE Electromagnetic Wave series, ISBN 0863410588, Chapter 2.3, pp. 66-72, published by Peter Peregrinus Ltd. on behalf of the Institution of Electrical Engineers, © 1986.
"Oil sands." Wikipedia, the free encyclopedia. Retrieved from the Internet from: http://en.wikipedia.org/w/index.php?title=Oil_sands&printable=yes, Feb. 16, 2009.
Sahni et al., "Electromagnetic Heating Methods for Heavy Oil Reservoirs." 2000 Society of Petroleum Engineers SPE/AAPG Western Regional Meeting, Jun. 19-23, 2000.
Power et al., "Froth Treatment: Past, Present & Future." Oil Sands Symposium, University of Alberta, May 3-5, 2004.
Flint, "Bitumen Recovery Technology a Review of Long Term R&D Opportunities." Jan. 31, 2005. LENEF Consulting (1994) Limited.
"Froth Flotation." Wikipedia, the free encyclopedia. Retrieved from the internet from: http://en.wikipedia.org/wiki/Froth_flotation, Apr. 7, 2009.
"Relative static permittivity." Wikipedia, the free encyclopedia. Retrieved from the Internet from http://en.wikipedia.org/w/index/php?title=Relative_static_permittivity&printable=yes, Feb. 12, 2009.
"Tailings." Wikipedia, the free encyclopedia. Retrieved from the Internet from http://en.wikipedia.org/w/index.php?title=Tailings&printable=yes, Feb. 12, 2009.
"Technologies for Enhanced Energy Recovery" Executive Summary, Radio Frequency Dielectric Heating Technologies for Conventional and Non-Conventional Hydrocarbon-Bearing Formulations, Quasar Energy, LLC, Sep. 3, 2009, pp. 1-6.
Burnhan, "Slow Radio-Frequency Processing of Large Oil Shale Volumes to Produce Petroleum-like Shale Oil," U.S. Department of Energy, Lawrence Livermore National Laboratory, Aug. 20, 2003, UCRL-ID-155045.
Sahni et al., "Electromagnetic Heating Methods for Heavy Oil Reservoirs," U.S. Department of Energy, Lawrence Livermore National Laboratory, May 1, 2000, UCL-JC-138802.
Abernethy, "Production Increase of Heavy Oils by Electromagnetic Heating," The Journal of Canadian Petroleum Technology, Jul.-Sep. 1976, pp. 91-97.
Sweeney, et al., "Study of Dielectric Properties of Dry and Saturated Green River Oil Shale," Lawrence Livermore National Laboratory, Mar. 26, 2007, revised manuscript Jun. 29, 2007, published on Web Aug. 25, 2007.
Kinzer, "Past, Present, and Pending Intellectual Property for Electromagnetic Heating of Oil Shale," Quasar Energy LLC, 28th Oil Shale Symposium Colorado School of Mines, Oct. 13-15, 2008, pp. 1-18.
Kinzer, "Past, Present, and Pending Intellectual Property for Electromagnetic Heating of Oil Shale," Quasar Energy LLC, 28th Oil Shale Symposium Colorado School of Mines, Oct. 13-15, 2008, pp. 1-33.
Kinzer, A Review of Notable Intellectual Property for In Situ Electromagnetic Heating of Oil Shale, Quasar Energy LLC.
A. Godio: "Open ended-coaxial Cable Measurements of Saturated Sandy Soils", American Journal of Environmental Sciences, vol. 3, No. 3, 2007, pp. 175-182, XP002583544.
Carlson et al., "Development of the I IT Research Institute RF Heating Process for In Situ Oil Shale/Tar Sand Fuel Extraction—An Overview", Apr. 1981.

PCT International Search Report and Written Opinion in PCT/US2010/025763, Jun. 4, 2010.
PCT International Search Report and Written Opinion in PCT/US2010/025807, Jun. 17, 2010.
PCT International Search Report and Written Opinion in PCT/US2010/025804, Jun. 30, 2010.
PCT International Search Report and Written Opinion in PCT/US2010/025769, Jun. 10, 2010.
PCT International Search Report and Written Opinion in PCT/US2010/025765, Jun. 30, 2010.
PCT International Search Report and Written Opinion in PCT/US2010/025772, Aug. 9, 2010.
U.S. Appl. No. 12/886,338, filed Sep. 20, 2010 (unpublished).
Butler, R.M. "Theoretical Studies on the Gravity Drainage of Heavy Oil During In-Situ Steam Heating", Can J. Chem Eng, vol. 59, 1981.
Butler, R. and Mokrys, I., "A New Process (VAPEX) for Recovering Heavy Oils Using Hot Water and Hydrocarbon Vapour", Journal of Canadian Petroleum Technology, 30(1), 97-106, 1991.
Butler, R. and Mokrys, I., "Recovery of Heavy Oils Using Vapourized Hydrocarbon Solvents: Further Development of the VAPEX Process", Journal of Canadian Petroleum Technology, 32(6), 56-62, 1993.
Butler, R. and Mokrys, I., "Closed Loop Extraction Method for the Recovery of Heavy Oils and Bitumens Underlain by Aquifers: the VAPEX Process", Journal of Canadian Petroleum Technology, 37(4), 41-50, 1998.
Das, S.K. and Butler, R.M., "Extraction of Heavy Oil and Bitumen Using Solvents at Reservoir Pressure" CIM 95-118, presented at the CIM 1995 Annual Technical Conference in Calgary, Jun. 1995.
Das, S.K. and Butler, R.M., "Diffusion Coefficients of Propane and Butane in Peace River Bitumen" Canadian Journal of Chemical Engineering, 74, 988-989, Dec. 1996.
Das, S.K. and Butler, R.M., "Mechanism of the Vapour Extraction Process for Heavy Oil and Bitumen", Journal of Petroleum Science and Engineering, 21, 43-59, 1998.
Dunn, S.G., Nenniger, E. and Rajan, R., "A Study of Bitumen Recovery by Gravity Drainage Using Low Temperature Soluble Gas Injection", Canadian Journal of Chemical Engineering, 67, 978-991, Dec. 1989.
Frauenfeld, T., Lillico, D., Jossy, C., Vilcsak, G., Rabeeh, S. and Singh, S., "Evaluation of Partially Miscible Processes for Alberta Heavy Oil Reservoirs", Journal of Canadian Petroleum Technology, 37(4), 17-24, 1998.
Mokrys, I., and Butler, R., "In Situ Upgrading of Heavy Oils and Bitumen by Propane Deasphalting: The VAPEX Process", SPE 25452, presented at the SPE Production Operations Symposium held in Oklahoma City OK USA, Mar. 21-23 1993.
Nenniger, J.E. and Dunn, S.G., "How Fast is Solvent Based Gravity Drainage?", CIPC 2008-139, presented at the Canadian International Petroleum Conference, held in Calgary, Alberta Canada, Jun. 17-19, 2008.
Nenniger, J.E. and Gunnewick, L., "Dew Point vs. Bubble Point: A Misunderstood Constraint on Gravity Drainage Processes", CIPC 2009-065, presented at the Canadian International Petroleum Conference, held in Calgary, Alberta Canada, Jun. 16-18, 2009.
Bridges, J.E., Sresty, G.C., Spencer, H.L. and Wattenbarger, R.A., "Electromagnetic Stimulation of Heavy Oil Wells", 1221-1232, Third International Conference on Heavy Oil Crude and Tar Sands, UNITAR/UNDP, Long Beach California, USA Jul. 22-31, 1985.
Carrizales, M.A., Lake, L.W. and Johns, R.T., "Production Improvement of Heavy Oil Recovery by Using Electromagnetic Heating", SPE115723, presented at the 2008 SPE Annual Technical Conference and Exhibition held in Denver, Colorado, USA, Sep. 21-24, 2008.
Carrizales, M. and Lake, L.W., "Two-Dimensional COMSOL Simulation of Heavy-Oil Recovery by Electromagnetic Heating", Proceedings of the COMSOL Conference Boston, 2009.
Chakma, A. and Jha, K.N., "Heavy-Oil Recovery from Thin Pay Zones by Electromagnetic Heating", SPE24817, presented at the 67th Annual Technical Conference and Exhibition of the Society of Petroleum Engineers held in Washington, DC, Oct. 4-7, 1992.

(56) References Cited

OTHER PUBLICATIONS

Chhetri, A.B. and Islam, M.R., "A Critical Review of Electromagnetic Heating for Enhanced Oil Recovery", Petroleum Science and Technology, 26(14), 1619-1631, 2008.

Chute, F.S., Vermeulen, F.E., Cervenan, M.R. and McVea, F.J., "Electrical Properties of Athabasca Oil Sands", Canadian Journal of Earth Science, 16, 2009-2021, 1979.

Davidson, R.J., "Electromagnetic Stimulation of Lloydminster Heavy Oil Reservoirs", Journal of Canadian Petroleum Technology, 34(4), 15-24, 1995.

Hu, Y., Jha, K.N. and Chakma, A., "Heavy-Oil Recovery from Thin Pay Zones by Electromagnetic Heating", Energy Sources, 21(1-2), 63-73, 1999.

Kasevich, R.S., Price, S.L., Faust, D.L. and Fontaine, M.F., "Pilot Testing of a Radio Frequency Heating System for Enhanced Oil Recovery from Diatomaceous Earth", SPE28619, presented at the SPE 69th Annual Technical Conference and Exhibition held in New Orleans LA, USA, Sep. 25-28, 1994.

Koolman, M., Huber, N., Diehl, D. and Wacker, B., "Electromagnetic Heating Method to Improve Steam Assisted Gravity Drainage", SPE117481, presented at the 2008 SPE International Thermal Operations and Heavy Oil Symposium held in Calgary, Alberta, Canada, Oct. 20-23, 2008.

Kovaleva, L.A., Nasyrov, N.M. and Khaidar, A.M., Mathematical Modelling of High-Frequency Electromagnetic Heating of the Bottom-Hole Area of Horizontal Oil Wells, Journal of Engineering Physics and Thermophysics, 77(6), 1184-1191, 2004.

McGee, B.C.W. and Donaldson, R.D., "Heat Transfer Fundamentals for Electro-thermal Heating of Oil Reservoirs", CIPC 2009-024, presented at the Canadian International Petroleum Conference, held in Calgary, Alberta, Canada Jun. 16-18, 2009.

Ovalles, C., Fonseca, A., Lara, A., Alvarado, V., Urrecheaga, K., Ranson, A. and Mendoza, H., "Opportunities of Downhole Dielectric Heating in Venezuela: Three Case Studies Involving Medium, Heavy and Extra-Heavy Crude Oil Reservoirs" SPE78980, presented at the 2002 SPE International Thermal Operations and Heavy Oil Symposium and International Horizontal Well Technology Conference held in Calgary, Alberta, Canada, Nov. 4-7, 2002.

Rice, S.A., Kok, A.L. and Neate, C.J., "A Test of the Electric Heating Process as a Means of Stimulating the Productivity of an Oil Well in the Schoonebeek Field", CIM 92-04 presented at the CIM 1992 Annual Technical Conference in Calgary, Jun. 7-10, 1992.

Sahni, A. and Kumar, M. "Electromagnetic Heating Methods for Heavy Oil Reservoirs", SPE62550, presented at the 2000 SPE/AAPG Western Regional Meeting held in Long Beach, California, Jun. 19-23, 2000.

Sayakhov, F.L., Kovaleva, L.A. and Nasyrov, N.M., "Special Features of Heat and Mass Exchange in the Face Zone of Boreholes upon Injection of a Solvent with a Simultaneous Electromagnetic Effect", Journal of Engineering Physics and Thermophysics, 71(1), 161-165, 1998.

Spencer, H.L., Bennett, K.A. and Bridges, J.E. "Application of the IITRI/Uentech Electromagnetic Stimulation Process to Canadian Heavy Oil Reservoirs" Paper 42, Fourth International Conference on Heavy Oil Crude and Tar Sands, UNITAR/UNDP, Edmonton, Alberta, Canada, Aug. 7-12, 1988.

Sresty, G.C., Dev, H., Snow, R.N. and Bridges, J.E., "Recovery of Bitumen from Tar Sand Deposits with the Radio Frequency Process", SPE Reservoir Engineering, 85-94, Jan. 1986.

Vermulen, F. and McGee, B.C.W., "In Situ Electromagnetic Heating for Hydrocarbon Recovery and Environmental Remediation", Journal of Canadian Petroleum Technology, Distinguished Author Series, 39(8), 25-29, 2000.

Schelkunoff, S.K. and Friis, H.T., "Antennas: Theory and Practice", John Wiley & Sons, Inc., London, Chapman Hall, Limited, pp. 229-244, 351-353, 1952.

Gupta, S.C., Gittins, Sd., "Effect of Solvent Sequencing and Other Enhancement on Solvent Aided Process", Journal of Canadian Petroleum Technology, vol. 46, No. 9, pp. 57-61, Sep. 2007.

* cited by examiner

APPARATUS AND METHOD FOR HEATING OF HYDROCARBON DEPOSITS BY AXIAL RF COUPLER

CROSS REFERENCE TO RELATED APPLICATIONS

This specification is related to
U.S. patent application Ser. No. 12/878,774 filed Sep. 9, 2010, Ser. No. 12/903,684 filed Oct. 13, 2010, Ser. No. 12/820,977 filed Jun. 22, 2010, Ser. No. 12/835,331 filed Jul. 13, 2010, and Ser. No. 12/886,338 filed Sep. 20, 2010, filed on or about the same date as this specification, each of which is hereby incorporated herein in its entirety by reference here.

This specification is also related to
U.S. patent application Ser. No. 12/396,284 filed Mar. 2, 2009, Ser. No. 12/396,247 filed Mar. 2, 2009, Ser. No. 12/396,192 filed Mar. 2, 2009, Ser. No. 12/396,057 filed Mar. 2, 2009, Ser. No. 12/396,021 filed Mar. 2, 2009, Ser. No. 12/395,995 filed Mar. 2, 2009, Ser. No. 12/395,953 filed Mar. 2, 2009, Ser. No. 12/395,945 filed Mar. 2, 2009 and Ser. No. 12/395,918 filed Mar. 2, 2009, each of which is hereby incorporated herein in its entirety by reference.

STATEMENT REGARDING FEDERALLY SPONSORED RESEARCH OR DEVELOPMENT

[Not Applicable]

BACKGROUND OF THE INVENTION

The invention concerns heating of hydrocarbon materials in geological subsurface formations by radio frequency (RF) electromagnetic fields and more particularly this invention provides a method and apparatus for heating mixtures containing bituminous ore, oil sands, oil shale, tar sands, or heavy oil by RF energy emitted by well casings that are coupled to an RF energy source.

Extraction from heavy oil reservoirs including oil sands deposits, shale deposits and carbonate deposits, requires heating of the deposits to separate hydrocarbons from other geologic materials and to maintain hydrocarbons at temperatures at which they will flow. One common known method of heating such deposits is known as steam assisted gravity drainage or SAGD. In SAGD, two parallel horizontal wells are drilled vertically adjacent to each other in a formation. The upper well is an injection well and the lower well is a production well. Steam is first introduced into both wells to heat heavy oil adjacent to the wells. Heavy oil drains into the production well creating a porous formation through which steam permeates outwardly to heat the formation. When heated oil can flow from the injection well to the production well, steam injection into the production well is stopped. Steam is injected into the injection well to heat a larger region surrounding the wells to continue extraction of heavy oil.

Among the disadvantages of SAGD is the addition of water to the materials which requires a large amount of energy to remove. For both environmental reasons and efficiency/cost reasons it is advantageous to reduce or eliminate the amount of water used in processing bituminous ore, oil sands, oil shale, tar sands, and heavy oil, and to provide a method of heating that is efficient and environmentally friendly and that is suitable for post-excavation processing of the bitumen, oil sands, oil shale, tar sands, and heavy oil. Many bitumen resources may be too shallow or with insufficient caprock for steam enhanced recovery.

Prior RF heating applicators, for heavy oil in subsurface formations have typically been vertical dipole like antennas. U.S. Pat. Nos. 4,140,179 and 4,508,168 disclose such prior dipole antennas positioned within vertical wells in subsurface heavy oil deposits to heat those deposits. Arrays of dipole antennas have been suggested to heat subsurface formations. U.S. Pat. No. 4,196,329 discloses an array of dipole antennas that are driven out of phase to heat a subsurface formation. Thus, prior systems for heating subsurface heavy oil bearing formations by RF has generally relied on specially constructed and structurally complex RF emitting structures that are positioned within a well.

SUMMARY OF THE INVENTION

An aspect of the invention concerns an apparatus for heating a material that is susceptible RF heating. The apparatus includes a source of RF power connected to an axial coupler that drives a linear element, such as a drill pipe, with RF energy.

Another aspect of the invention concerns a method of heating a material by coupling RF energy to pipes that are positioned adjacent to each other within a geological deposit of hydrocarbon material and controlling the phase relationship of the RF energy in each pipe to create a desired field of energy adjacent to the pipes.

Yet another aspect of the invention includes use of an axial reactor that is adjacent to an element that emits RF energy to start and stop RF current flow through the emitting element.

DETAILED DESCRIPTION OF THE PREFERRED EMBODIMENTS

The present invention will now be described more fully hereinafter with reference to the accompanying drawings, in which one or more embodiments of the invention are shown. This invention may, however, be embodied in many different forms and should not be construed as limited to the embodiments set forth herein. Rather, these embodiments are examples of the invention, which has the full scope indicated by the language of the claims. Like numbers refer to like elements throughout.

RF heating may provide for extraction of otherwise stranded resources as it may provide heating at reduced underground pressures. RF electromagnetic heating may comprise the application of up to three separate RF energies; electric fields, magnetic fields and electric currents. Heavy oil formations frequently contain in situ liquid water providing a good susceptor for RF heating. For instance, the Athabasca region oil sands of Canada may have electrical conductivities between about 0.002 to 0.15 mhos/meter at frequencies below 1 MHz making the oil sand suitable for RF heating.

Figure 1:
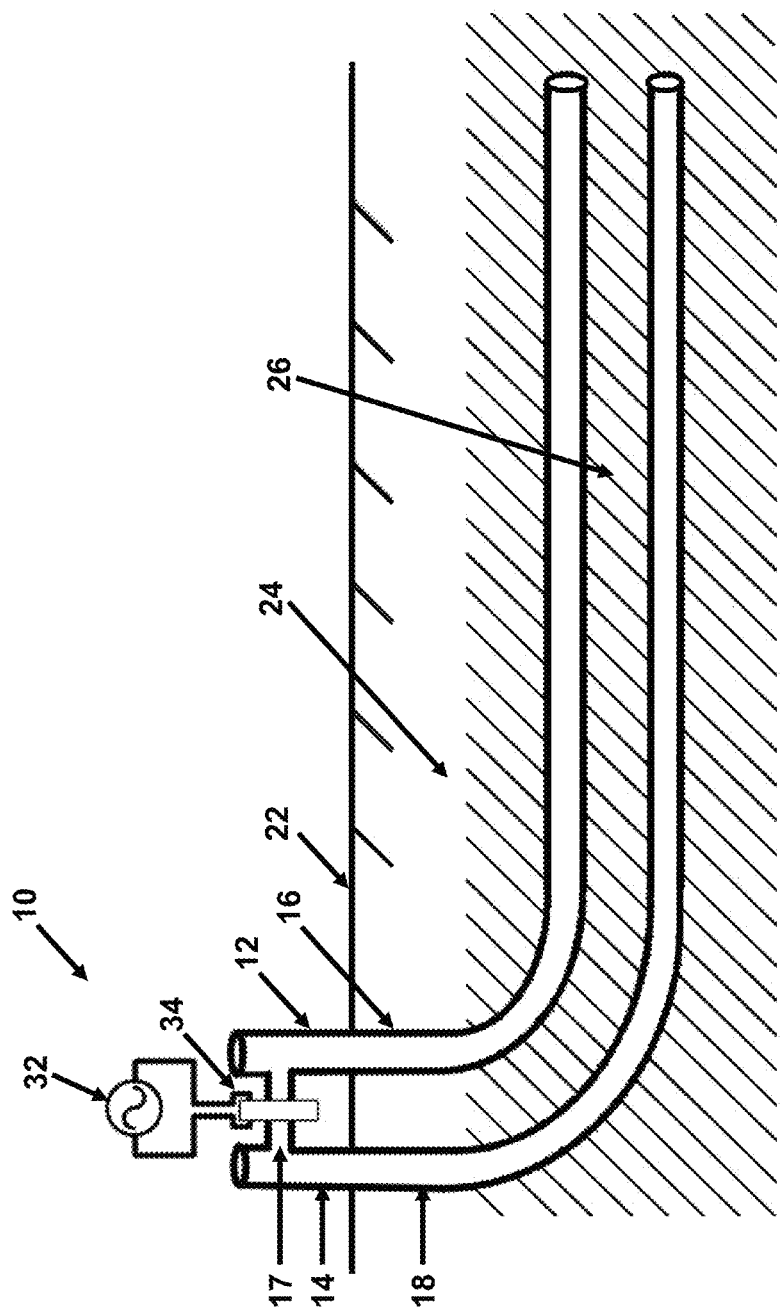
FIG. 1 illustrates an apparatus according to the present invention for emitting RF energy into a hydrocarbon deposit.

FIG. 1 illustrates an RF driving apparatus 10 according to the present invention for coupling RF energy into pipes 12 and 14 that extend into adjacent bores 16 and 18 of a well. The bores 16 and 18 are separated from each other and extend downwardly from the surface 22 through the overburden 24 of a hydrocarbon deposit 26. As shown, the bores 16 and 18 turn from the downward direction to extend generally horizontally through the hydrocarbon deposit 26. The bore 16 is parallel to and above the bore 18 as the bores extend through the deposit 26. This configuration is conventionally used for SAGD extraction of hydrocarbon material.

The apparatus 10 includes an RF energy source 32 that drives an RF coupler 34 that is adjacent to an electrically conductive shunt element 17 connected between the pipes 12 and 14. The electrically conductive shunt element 17 may be for instance a hollow pipe carrying a liquid or a solid metal wire. An embodiment of the RF driving apparatus 10 is shown by FIG. 2.

Figure 2:
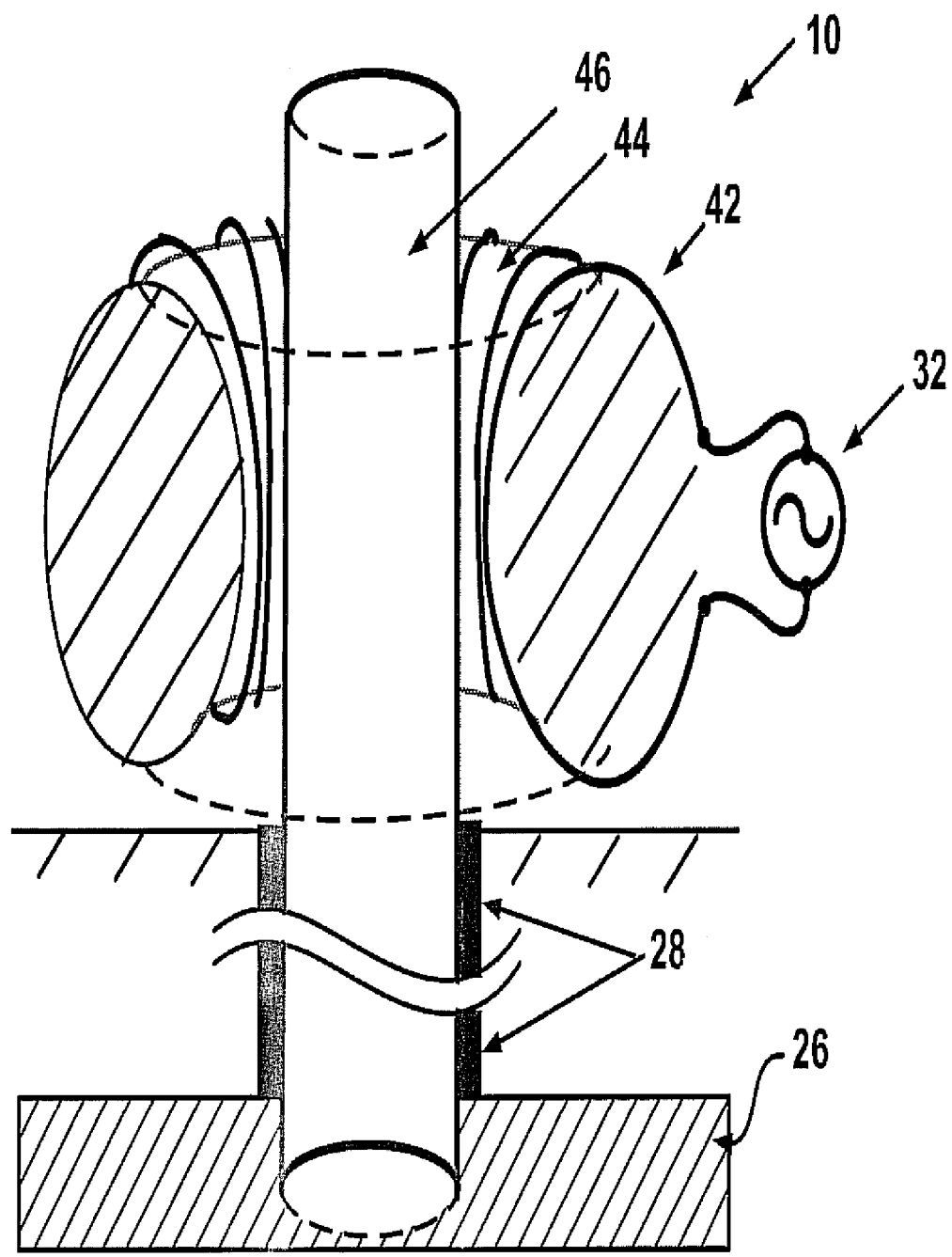
FIG. 2 illustrates an apparatus according to the present invention for coupling RF energy into a linear conductive element.

The driving apparatus 10 shown by FIG. 2, which is a cross sectional view, includes the RF energy source 32 that includes impedance matching circuitry to maintain efficient energy transfer. The coupler 34 includes an RF conductive driving winding 42 that extends from one connection to the RF energy source 32, around a section of a magnetic toroid 44 one or more times, and extends to a second connection of the RF energy source 32. The wire of driving winding 42 preferably includes a surface insulation, such as enamel or Teflon and the conductors of driving winding 42 may be of solid or Litz wire type. The toroid 44 forms a closed loop that extends around a pipe 46. The toroid is preferably made of high permeability magnetic materials such as iron wire, iron tape ferrite, iron powder and or silicon steel laminations. A mineral oil bath (not shown) may be used to cool the toroid 44. The magnetic toroid 44 extends around a coupled linear conductive element that is shown as pipe 46. The coupled linear element may also be metal wire, cable, or even a litz cable. Note that in the FIG. 2 embodiment coupler 34 advantageously provides an electrical connection onto the end of a single pipe where two conventional electrical two terminals may not be easily formed.

A theory of operation for the FIG. 2 embodiment will now be described. The RF energy source 32 applies a RF electric potential (voltage) across the two connections to the driving winding 42 causing a RF electric current to flow therein. The current in driving winding 42 then creates a RF magnetic field according to Ampere's law which is captured by the magnetic toroid 44. The toroid 44 provides a magnetic path or "magnetic circuit" to intensify and convey the magnetic field circumferentially around the pipe 46. The RF magnetic field of toroid 44 in kind induces an electric current to flow axially along the outer surface of pipe 46. The induced axially flowing RF electric current moves downward to the lower portion 48 of pipe 46. The lower portion 48 of pipe 46 passes into hydrocarbon deposit 26 and the pipe 46 then conveys RF electric current there. Heating in the hydrocarbon deposit 26 may then be realized in several ways depending on RF frequency and formation properties, e.g. electrical conductivity and permittivity. In a preferred concept of operation, eddy electric currents are formed by induction in the hydrocarbon deposit 26 which dissipate as heat by Joule effect according to the familiar electrical heating formula $I^2R$. The present invention is not limited to eddy current heating of hydrocarbon formation. RF current may also create E fields that provide dielectric heating of the connate polar water molecules at high frequencies. In addition, E fields can heat at low frequencies by becoming displacement currents, or conduction currents that may be placed in the formation by the pipe 46 acting as an electrode.

Figure 3:
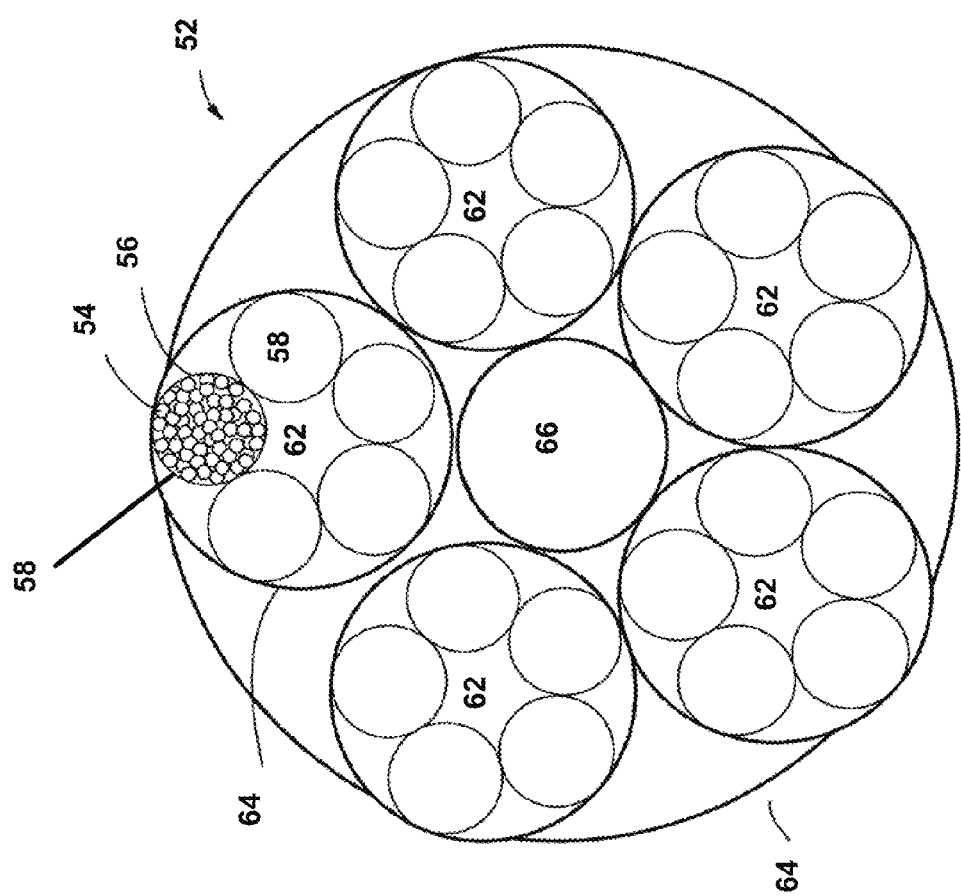
FIG. 3 illustrates a cross section of an embodiment of the driving winding of the apparatus shown by FIG. 2.

As described by the inventor's U.S. Pat. No. 7,205,947, the entirety of which is incorporated herein by reference, RF current tends to flow along the surface of conductors in an effect that is referred to as a skin effect. This effect and the winding proximity affect between turns limits the useful amount of a conductors cross section for carrying RF energy. Because the driving winding 42 is intended to convey significant energy, this skin effect is particularly undesirable in the driving winding 42. As described by the applicant's U.S. patent, Litz wires can be used to reduce the undesirable skin effect in the system. As shown by the cross section of a Litz wire 52 illustrated by FIG. 3, a Litz wire is formed by a plurality of wires 54 that are braided together. The plurality of wires 54 are preferably individually insulated wires with an outer insulation 56 to form an insulated bundle 58. Dielectric strands may be included with the plurality of wires 54. Groups 62 of insulated bundles 58 may be braided or twisted together and include an outer insulation 64. The groups 62 may also be braided or twisted together to define the Litz wire driving winding 42 with a further outer insulation 64. The groups 62 may be braided or twisted about a core 66 made of dielectric. Litz conductors are beneficial for a reduction of RF skin effect, magnetic skin effect in iron conductors, and conductor proximity effect.

As shown by FIG. 1, pipes that extend into hydrocarbon deposits frequently extend through geologic overburden. Overburden is often electrically conductive so RF energy may be lost by conduction or otherwise from the pipe as it passes through the overburden. The RF driving apparatus may most conveniently be located above the surface 22 and the objective is of course to convey the RF energy through the overburden 24 without loss to the hydrocarbon deposit. Loss of energy to the overburden 24 may be avoided by providing a surrounding the section of the pipe that is in the overburden with a material that inhibits or prevents energy loss. In the embodiment of FIG. 2, a material 28 surrounds the section of the pipe 46 that is in the overburden. The material 28 may be insulation and may also be a coating of a bulk nonconductive magnetic shielding material such as powdered iron mixed into a nonconductive media such as silicon rubber or Portland cement.

Figure 4:
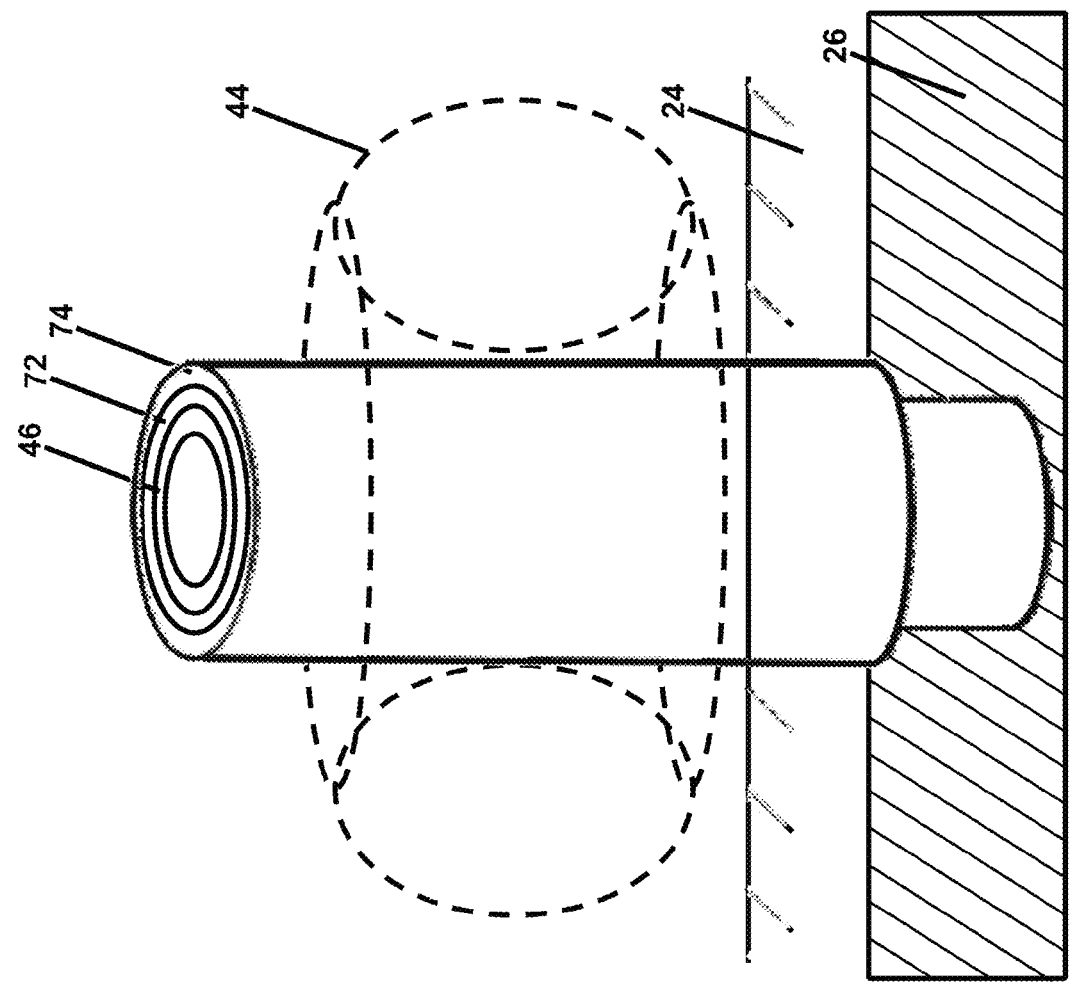
FIG. 4 illustrates a section of a pipe having an RF conductive coating and insulation.

FIG. 4 shows schematically a pipe 46 extending through the overburden 24 and into the hydrocarbon deposit 26. An insulating material 74 surrounds the section of the pipe 46 that extends from the magnetic toroid 44 (indicated in outline by dotted lines) to the hydrocarbon deposit 26. The insulating material 74 may be epoxy, ceramic or other conventional electrical insulating material. The insulating material 74 may also include the property of ferromagnetism, e.g. having a high magnetic permeability, by the inclusion of iron power or powdered ferrite in the conventional insulating material. In addition to reducing loss by conduction to overburden, the efficiency of RF coupling may be enhanced by providing a coating of highly conductive material that conducts RF energy with lower loss than conventional steel pipe material over the pipe 46 adjacent to the toroid 44 and extending to the hydrocarbon deposit 26. One such material is copper which, because it is not magnetic, conducts RF current deeper into the material from the surface than does steel and which is approximately 20 times more conductive than steel. As shown by FIG. 4, a coating of copper plating 72 may be provided on the outer surface of the pipe 46 to enhance RF coupling with the toroid 44.

Figure 5:
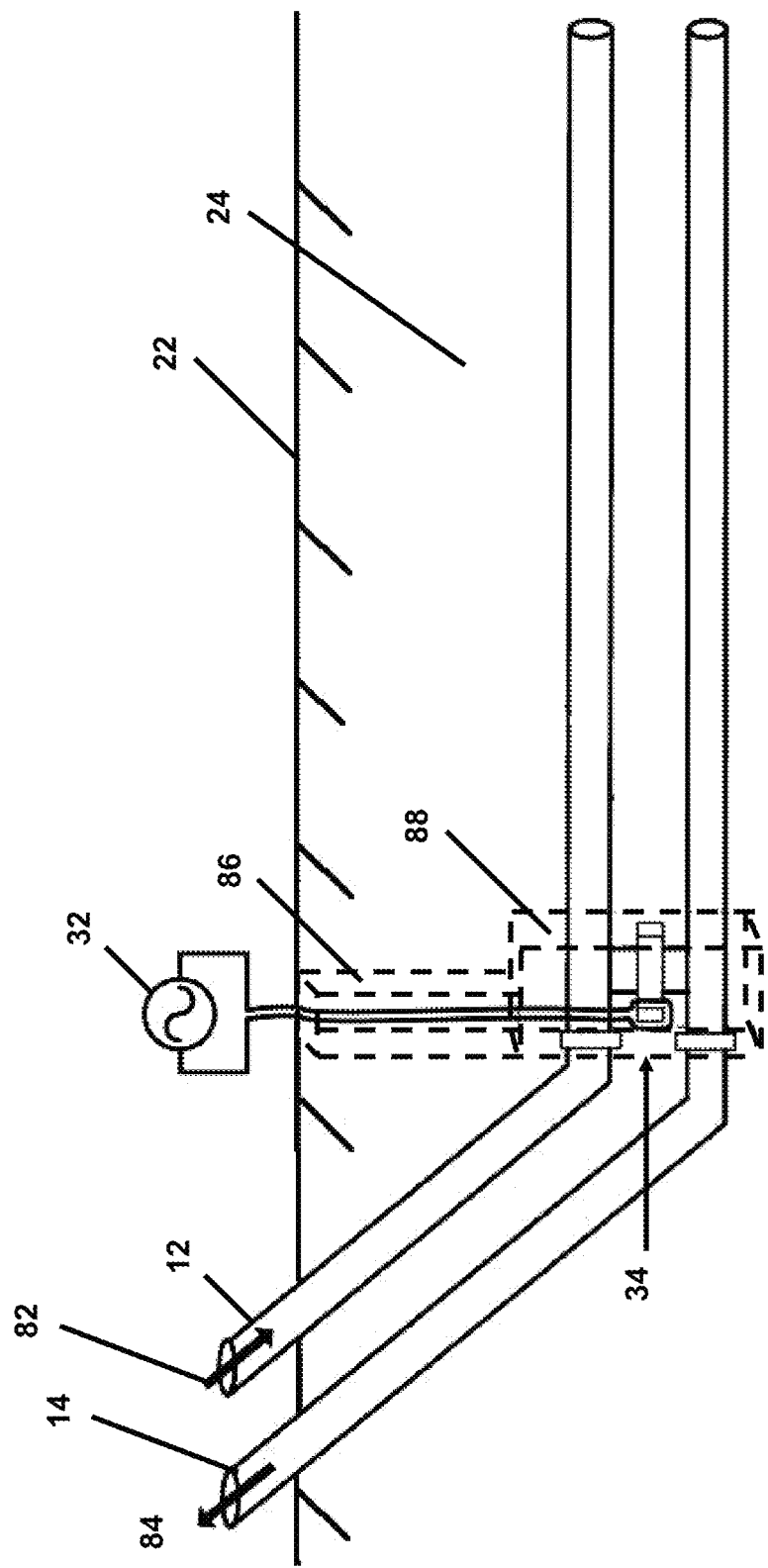
FIG. 5 illustrates an apparatus according to the present invention positioned in a chamber within a hydrocarbon deposit.

An alternative to insulating pipe that extends through the overburden is illustrated by FIG. 5. In FIG. 5, the RF energy source 32 is positioned above the surface 22 of the overburden. A shaft 86 extends downwardly through the overburden 24 to a chamber 88 in the hydrocarbon deposit 26. The pipes 12 and 14 extend through the chamber 88. The shunt element 17 extends from the pipe 12 to the pipe 14 in the chamber 88, and the RF coupler 34 is positioned adjacent to the shunt element 17 within the chamber 88. This configuration has the advantage of providing RF energy to the pipes 12 and 14 at a location at which the energy loss from the pipes 12 and 14 to surrounding material is desired. As shown, this configuration can augment steam heating as used by conventional SAGD operation. Steam 82 is introduced into pipe 12 and oil 84 is removed from pipe 14 above the surface 22 at a location that is remote from the RF coupler 34.

Figure 6:
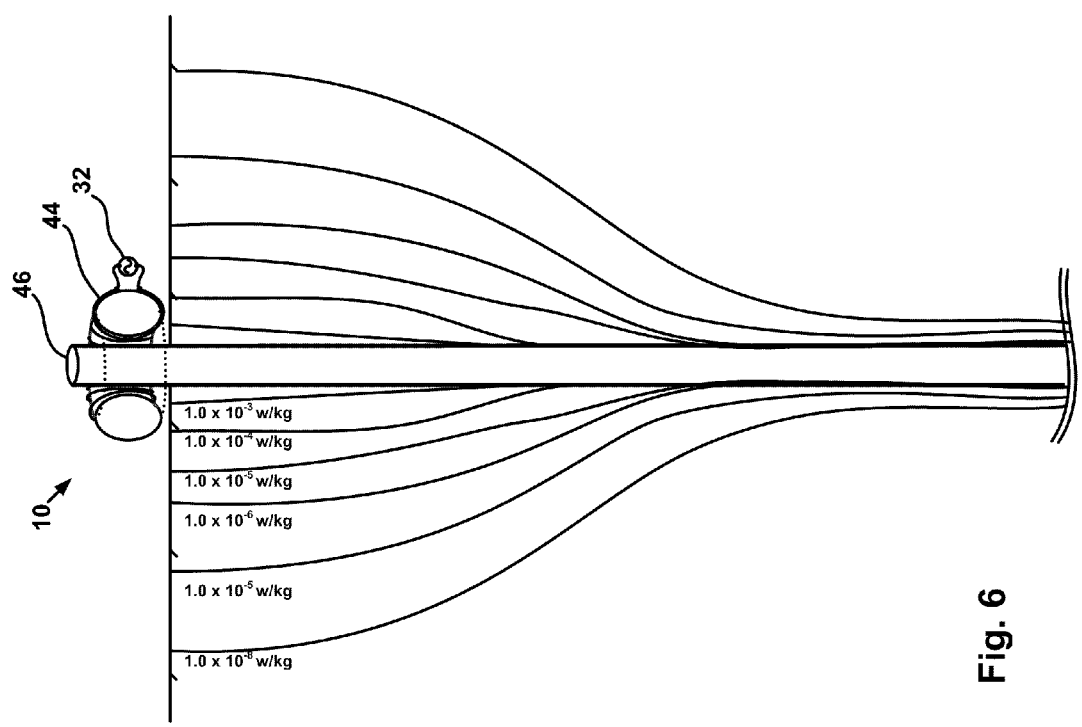
FIG. 6 illustrates a simulation of transfer of RF energy from a conductive element to surrounding hydrocarbon material.

FIG. 6 illustrates the simulated specific absorption rate of heat in watts/kilogram from an RF electromagnetic field that is created in a geologic formation by a pipe that extends into the geologic formation and that is coupled to an RF energy by a toroid that is positioned above the surface. FIG. 6 demonstrates that significant energy may be transferred to the geologic formation from a conductive element that is coupled to RF energy. The pipe 46 includes the magnetic toroid 44 which is shown in cross section only for clarity. In FIG. 6 the RF energy source 32 is applying a power of 1 watt for illustration although powers levels of 0.5 to 10 megawatts may be used depending on the desired speed of heating, well length etc. The time is at t=0 so the radio frequency electrical current has just been turned on. The heat penetration is nearly instantaneous and as can be appreciated the radial half power heating radius may be 10 meters or more depending on the conductivity of the formation. The longitudinal penetration along the well may be about 2 radio frequency skin depths according to the well known formula $\delta = \sqrt{2\rho/\omega\mu}$ so this can be adjusted by selection of the frequency of the RF energy source 32. In the FIG. 6 example the applied power is 1 watt, the frequency is 13.56 Mhz, and the formation initial conductivity is 0.01 mhos/meter. In the example 1 watt of applied RF was used to simplify comparisons and powers levels of say 0.5 to 5 megawatts may be used depending on the well length, heating speed, and realized temperature requirements. If the heating is allowed to progress over time the liquid water in the formation adjacent to the well pipe will reach the saturation temperature, e.g. the liquid water near the well pipe will be turned to high quality steam. When this saturation zone matures a traveling wave steam front moves downwards along the well and this extends the depth of the heating so the heated zone grows over time. This effect occurs because the RF heating becomes thermally regulated at the saturation temperature at the depth and pressures. Liquid water is a RF heating susceptor whereas water vapor is not. Thus the present invention may heat to great depths by thermodynamics. The realized temperature map along the well (not shown) can be 100 C at the surface to about 300 C depending on the well depth. Heavy oil may occur closer to the surface than conventional oil. In the FIG. 6 configuration, a higher radio frequency was used and an electrically nonconductive coating was not used over the pipe so the heating began at the surface as may be valuable for environmental remediation. Lower frequencies and insulative coatings on the pipe 46 may reduce heating near the surface.

Figure 7:
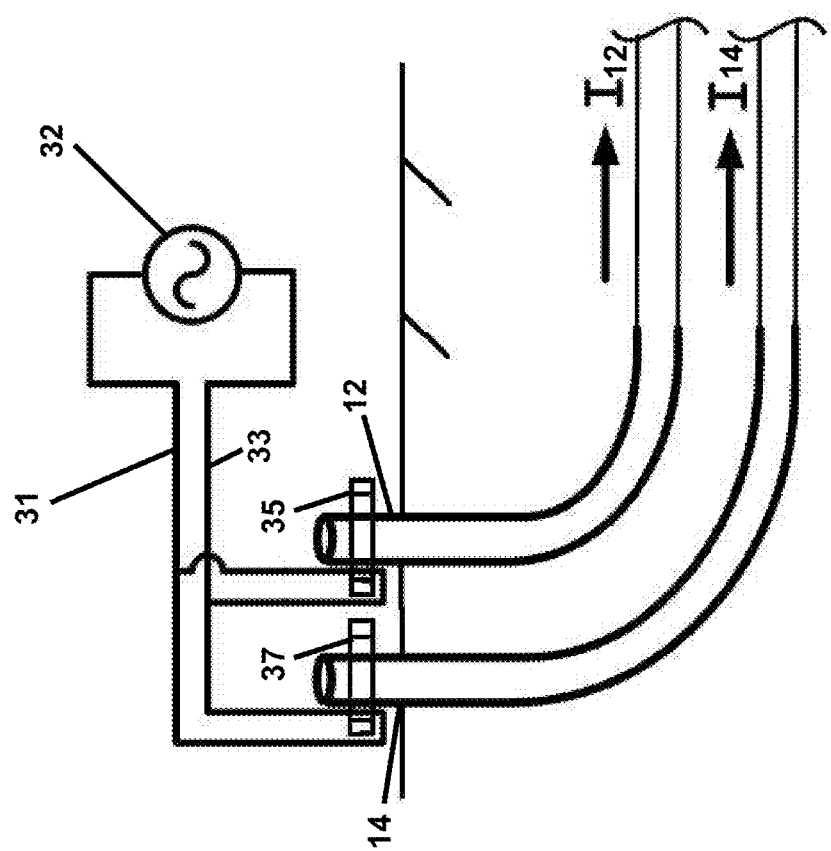
FIG. 7 illustrates an apparatus according to the present invention in which separate RF couplers provide in-phase RF energy to two conductive elements that extend into a hydrocarbon material.
Figure 8:
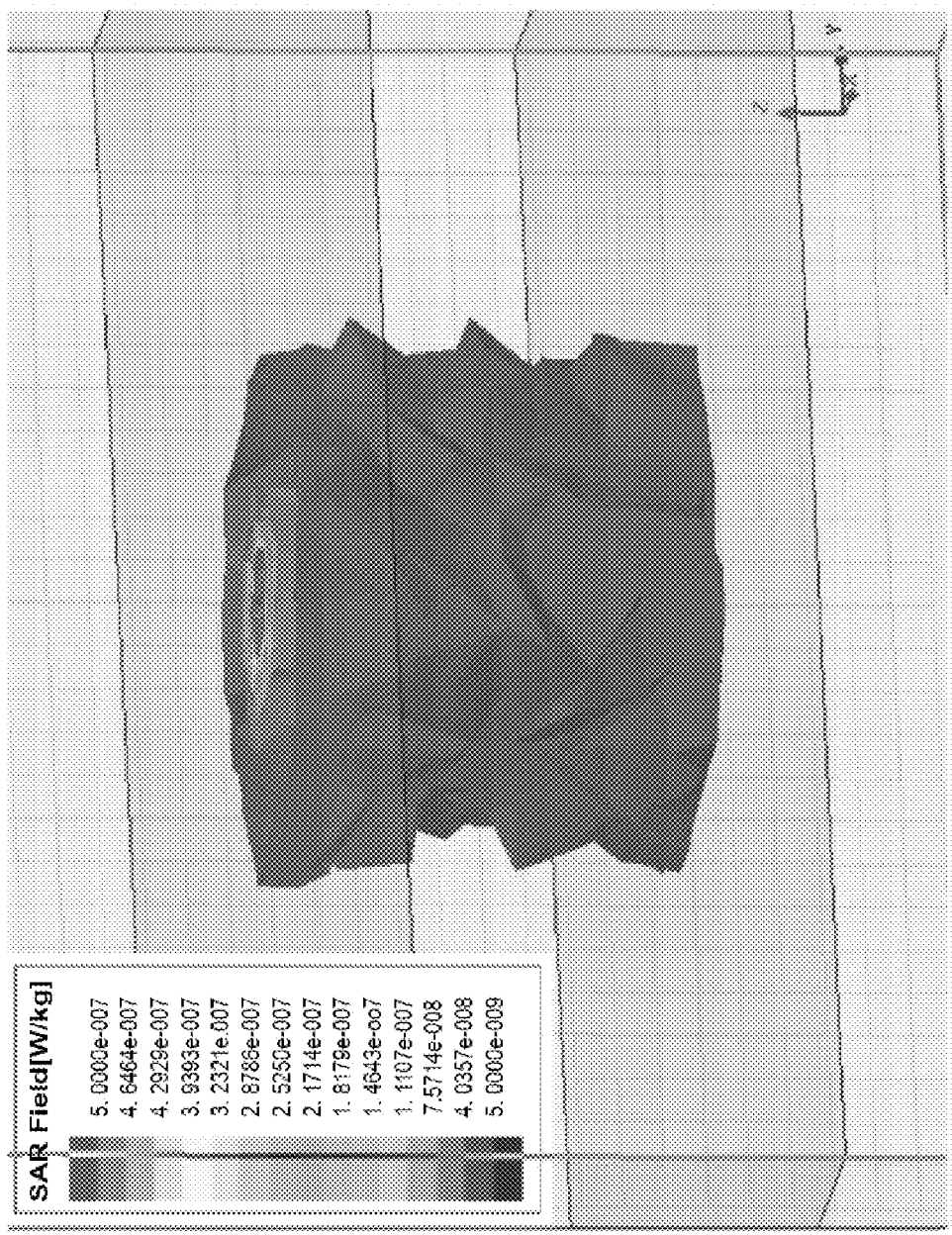
FIG. 8 illustrates RF energy transfer created by a simulation of operation of the apparatus shown by FIG. 7.

FIG. 7 illustrates apparatus for coupling RF energy into pipes 12 and 14 by separate RF couplers 35 and 37, respectively. No shunt element is provided to connect pipes 12 and 14. Both the couplers 35 and 37 are driven by the RF energy source 32. The RF energy source 32 has a first connection 31 and a second connection 33. As illustrated schematically by FIG. 7, the connections 31 and 33 are connected to the couplers 35 and 37 to drive the couplers 35 and 37 in the same phase with each other as indicated by arrows $I_{12}$ and $I_{14}$ to thereby form two separate dipole antennas. That in-phase RF driving creates a field surrounding the pipes 12 and 14 that is generally circular as illustrated by the simulation results shown by FIG. 8.

Figure 9:
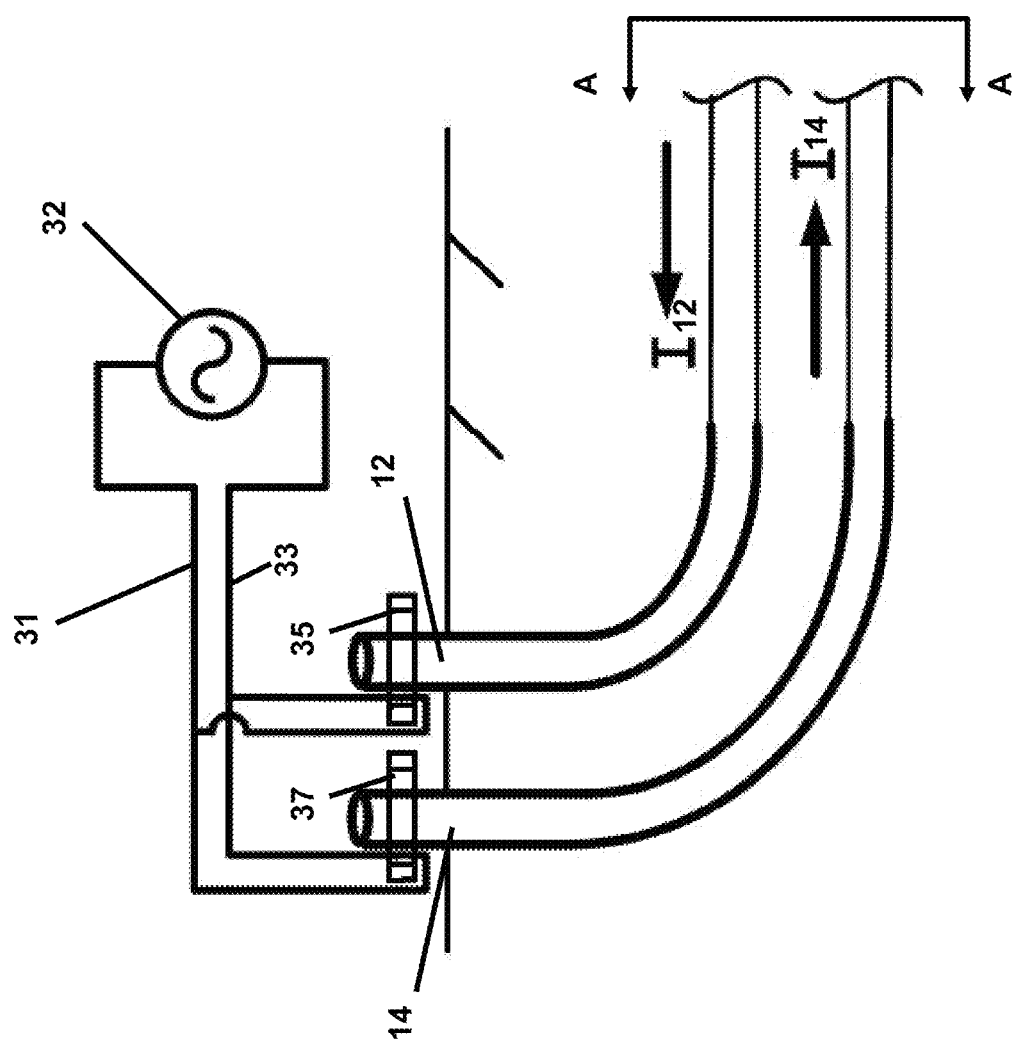
FIG. 9 illustrates an apparatus according to the present invention in which separate RF couplers provide out-of-phase RF energy to two conductive elements that extend into a hydrocarbon material.

FIG. 9 illustrates apparatus similar to that shown by FIG. 7 for coupling RF energy into pipes 12 and 14 by separate RF couplers 35 and 37, respectively. No shunt element is provided to connect pipes 12 and 14. Both the couplers 35 and 37 are driven by the RF energy source 32. The RF energy source 32 has a first connection 31 and a second connection 33. As illustrated schematically by FIG. 9, the connections 31 and 33 are connected to the couplers 35 and 37 to drive the couplers 35 and 37 out of phase with each other as indicated by arrows $I_{12}$ and $I_{14}$ to thereby act similar to a single skeleton slot dipole antenna.

Figure 10:
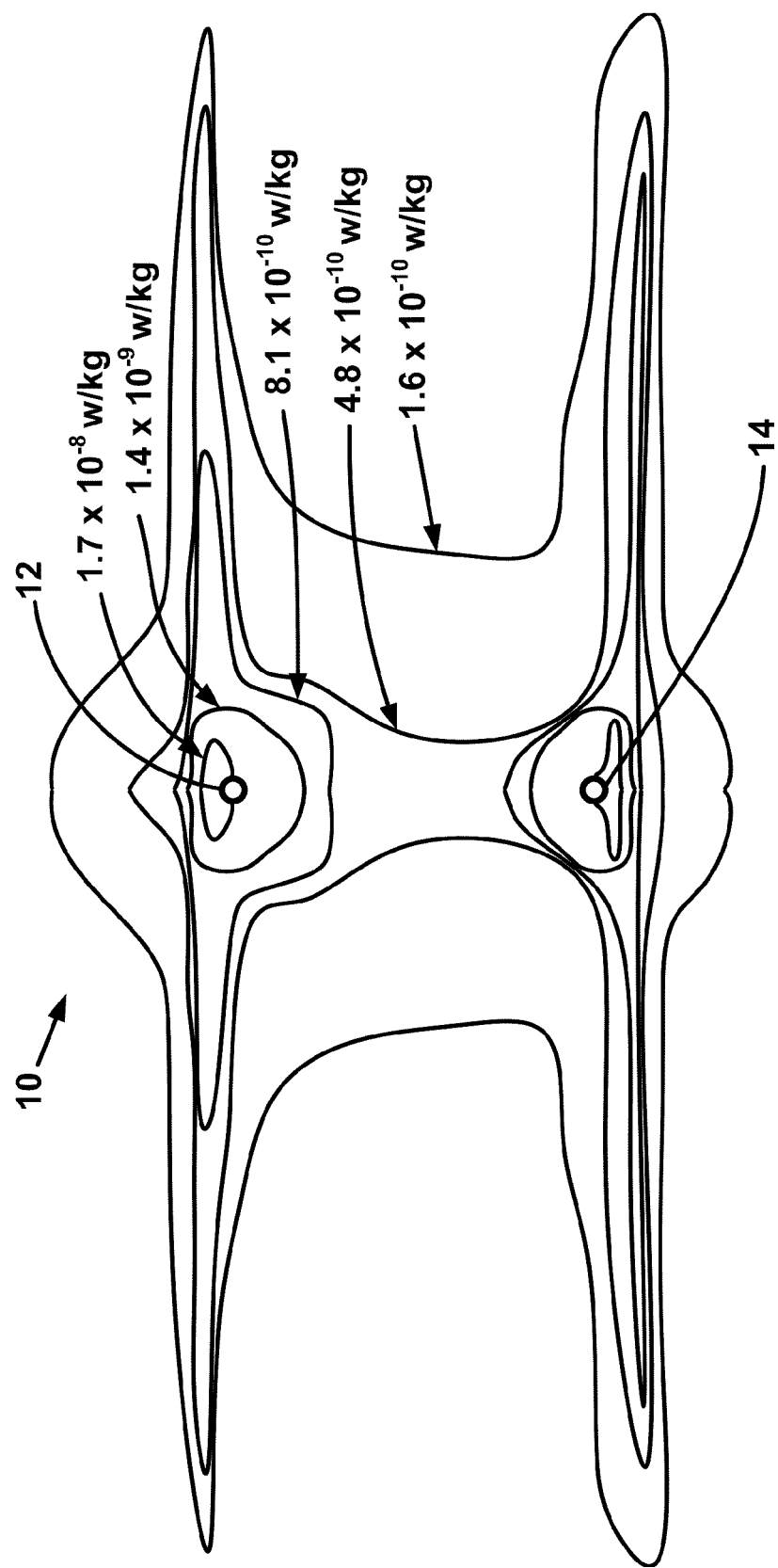
FIG. 10 illustrates RF energy transfer created by a simulation of operation of the apparatus shown by FIG. 9.

The out-of-phase RF driving creates electromagnetic fields surrounding the pipes 12 and 14 that extend horizontally from the pipes 12 and 14 as illustrated by the simulation results shown by FIG. 10 which is a cut for in the plane A-A of FIG. 9. In FIG. 10 the pipes 12 and 24 are oriented into and out of the page, the specific absorption rate contours are in units of watts/kilogram, and the heating is occurring at time t=0 which is the initial application of RF power. The radio frequency of the transmitter at the surface was 1 KHz and the transmit power was 1 watt for convenience of scaling. Full scale systems may apply about 0.5 to 10 megawatts depending on the desired speed of heating, well length, well spacing etc. The underground formation was rich Athabasca oil sand with and measured induction resistivity values were used in the analysis: 0.0055 mhos/meter conductivity for the ore, 0.060 mhos/meter for the overburden and 0.2 mhos/meter below the ore where there was increased water and salt. As the overburden and underburden above and below the hydrocarbon ore were more electrically conductive than the ore they were akin to capacitor plates which increased the heating along the boundary conditions. There was also a focusing of the heating energy between the well pipes that may be beneficial for starting up steam assist gravity drainage (SAGD) well pairs to initiate steam convection. The focused heating between the well pipes is by displacement current, e.g. electric field induction and due to the constructive addition of circular magnetic near fields between the pipes which cause eddy electric currents. A low amplitude circular herringbone like ripple pattern was present in the heating contour map (which cannot be rendered in the line format of contour plot of FIG. 10) further confirming the importance of the circular magnetic near field. If the heating shown in FIG. 10 is continued, temperatures thermally regulate and limit at the steam saturation temperature or boiling point of the underground water. The steam saturation zone forms between the well pipes and it grows with time. Thus the heated zone will expand outwards from the wells over time as the steam saturation zone blooms in size. The RF electromagnetic heating is durable and reliable because electrically conductive contact with the liquid water in the formation is not required due to the electric field induction magnetic field induction. Thus the well antennas can be effective when they are located in steam saturation zones or ullage cavities caused by ore withdrawal The present invention includes methods to synthesize or vary shape of the RF heating patterns in the formations. The method includes adjustment of radio transmitting frequency and the lowering the frequency increases the penetration and the thermal gradient, and lowering the radio frequency does the opposite. The method includes the use of electrically insulation coating on the well pipe antenna(s) to increase longitudinal penetration of heating along the well. The method includes raising the frequency to modify the thermodynamics of the steam saturation zone growth as the electromagnetic heating has a much faster rate penetration (nearly instantaneous) relative conducted heating which is much much slower.

Figure 11:
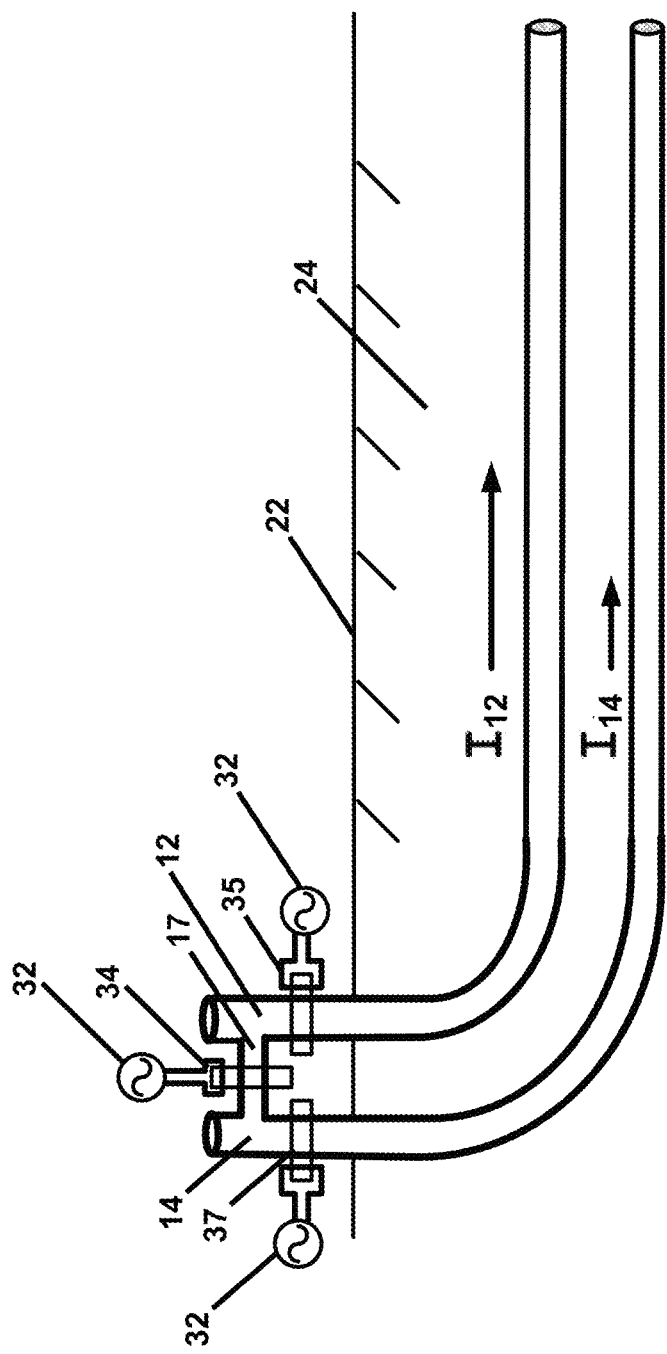
FIG. 11 illustrates an apparatus according to the present invention in which separate RF couplers provide in-phase RF energy to two conductive elements that extend into a hydrocarbon material and to a shunt element that is connected to the two conductive elements.

FIG. 11 illustrates an apparatus for coupling RF energy into pipes 12 and 14 to form a desired RF field. RF couplers 35 and 37 are adjacent to pipes 12 and 14, respectively, and the RF coupler 34 is adjacent to the shunt element 17 that is connected to the pipes 12 and 14. Each RF coupler, 34, 35 and 37 is connected to its own RF energy source 32. By this apparatus, the RF energy provided to each RF coupler 34, 35 and 37 can be separately controlled to adjust the shape and strength of the RF field around the pipes 12 and 14. Thus a multiplicity of RF couplers may be employed with the present invention to synthesize various underground RF heating patterns. For instance, the many RF couplers at intervals can control axial heat penetration along the well and the RF couplers may be supplied with RF power at different amplitudes and phases to adjust RF current distribution along the pipe from say sinusoidal to binomial to uniform.

Figure 12:
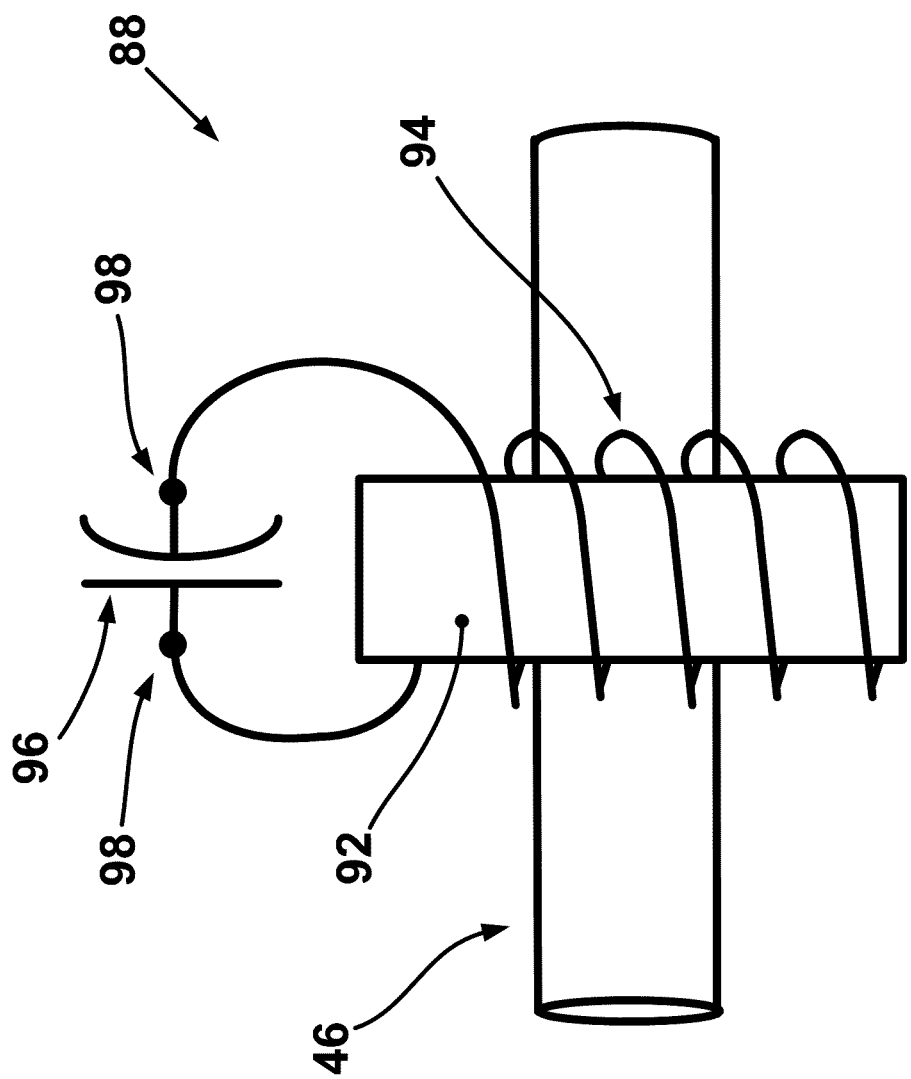
FIG. 12 illustrates an RF axial reactor for controlling RF current in an apparatus according to the present invention.

FIG. 12 illustrates an axial reactor 88 that can start and stop current flow along an axial conductor such as a pipe 46 in an apparatus according to the present invention. The axial reactor 88 inserts a series inductive reactance which may serve as an RF choke. The axial reactor 88 includes a magnetic toroid 92 that extends around the pipe 46. A winding 94 wraps around the toroid 92 to terminate at its opposite ends to a capacitor 96. The axial reactor 88 couples to magnetic field created by RF current flowing along the pipe 46 preventing flow of that current past the axial reactor 88 by causing a series inductance to be referred in series with the pipe 46. Electrically, the axial reactor 88 is equivalent to the pipe 46 being cut in two and a series winding inserted. The FIG. 12 embodiment axial reactor 88 provides maximum effect at resonance and the frequency of resonance is about $F_r = 1/2\pi\sqrt{(LC)}$, where L is the inductance of the winding 94 in henries and C the capacitance of the capacitor 96 in farads. In another embodiment of the axial reactor 88 (not shown) the capacitor 96 is omitted, the two ends of the winding 94 are connected together, and the number of turns in the winding 94 increased to resonate the axial reactor 88 by distributed capacitance between the turns. Of course the axial reactor 88 is not limited to only operate at resonance. In another embodiment (not shown) which may be preferred for operation over a range of frequencies winding 94 is omitted from the embodiment of FIG. 12.

Figure 13:
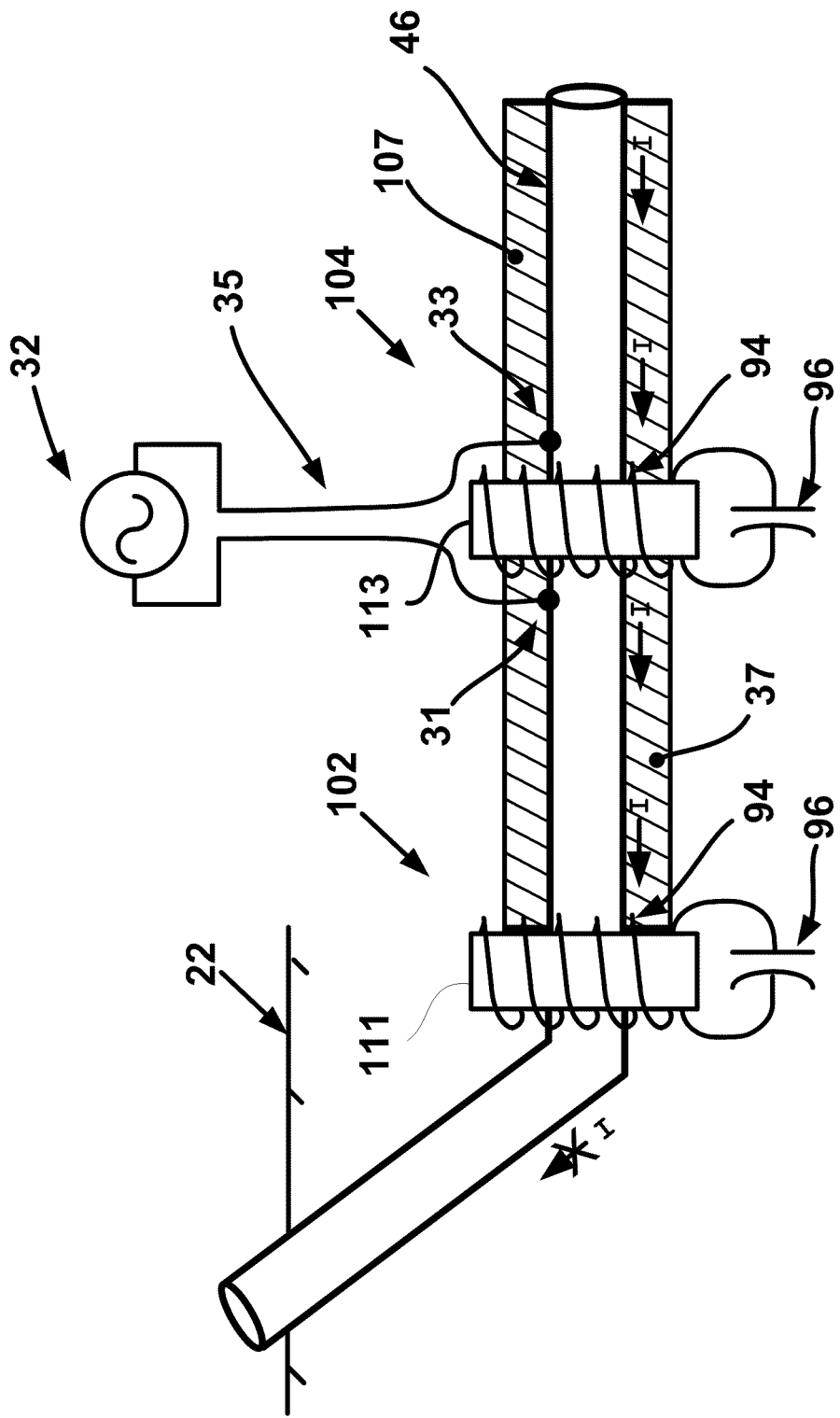
FIG. 13 illustrates an apparatus according to the present invention including an RF axial reactor as shown by FIG. 12.

FIG. 13 illustrates an apparatus according to the present invention for including two axial reactors 102 and 104. The axial reactor 104 is located along the pipe 46 approximately midway along its horizontal extent in a hydrocarbon deposit. The RF energy source 32 has connections 31 and 33 that are connected to the pipe 46 on opposite sides of the axial reactor 104. A transmission line 35 such as coax cable or insulated wires may be used between the RF energy source 32 and connections 31 and 33 The axial reactor 104 prevents flow of RF current thereby creating a conventional dipole antenna configuration. A second axial reactor 102 is positioned at a location that is separated from the axial reactor 104 at which the pipe 104 extends upwardly toward the surface 22. The axial reactor 102 prevents loss of RF energy in the overburden by preventing RF current from reaching the section of pipe 46 that passes through the overburden, so the heating zone 107 may be confined to one side of reactor 102. In a preferred embodiment the axial reactors 102 and 104 contain windings 94 which resonated with capacitors 96, however the invention is not so limited as to require the capacitors or even the windings as magnetic cores 111 and 113 alone may provide sufficient choking and driving effect in some instances.

Figure 14:
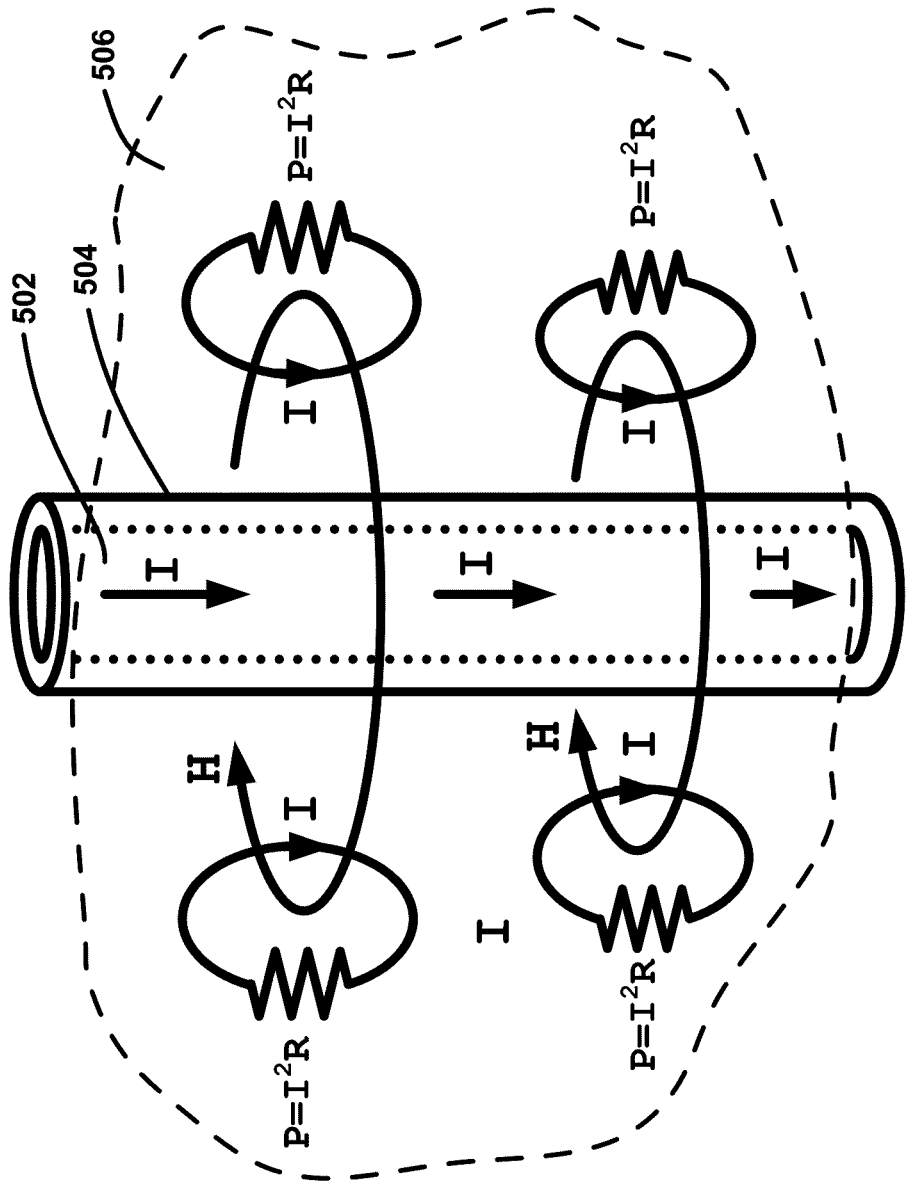
FIG. 14 illustrates an eddy current heating mechanism of the present invention.

Referring to FIG. 14 a description of one of the several heating methods, e.g. an eddy current method, of the present invention will now be described. It is understood that FIG. 14 is intended to teach theory of operation within the scope of the present invention. It is also understood that the present invention can provide heating by other than electromagnetic energy or method and is not limited to eddy currents. In the FIG. 14 diagram an RF electric current I flows axially along a conductive antenna pipe 502. The pipe 502 is covered in a nonconductive electrical insulation 504 like epoxy or Teflon® (polytetrafluoroethylene). The insulated pipe then passes through a region of electrically conductive material 506 such as a hydrocarbon ore containing liquid water. The axial RF electric current I causes a magnetic near field H to circle around the pipe 502 according to ampere's law. The magnetic field H in turn causes eddy currents I to form in the partially conductive material 506. Resistive heating then occurs in the material 506 by joule effect according to the common relation $P=I^2R$. As can be appreciated, the ore heating can be caused without direct electrical contact, e.g. it is not necessary for pipe 502 to be in contact like an electrode. The eddy current method of RF heating may be more robust and reliable in hydrocarbon ores than electrode methods which can require bare conductors and direct liquid water contact. Eddy current heating as described can remain effective when the pipe 502 is "stranded" from the ore in an ulluge or cavity, or when the pipe 502 is surrounded by a layer of desiccated sand. In general the RF frequency can be raised as necessary to ensure the heating effect as the underground formation changes over time during the resource extraction. In eddy current heating the load resistance and in turn the antenna driving resistance, rises rapidly with rising frequency which can be adjusted to minimize conductor losses in the antenna pipe 502 proper. In some rich bituminous ores frequencies of 600 to 2000 Hertz may offer useful trades between penetration/heating gradient and sufficiently high antenna driving resistances. In the eddy current method far field waves, such as microwaves or radio waves are not used and but rather reactive near magnetic fields are used. As background, is unnecessary that the antenna be of the loop type, e.g. curling or circular to obtain eddy current heating by magnetic fields. Loop type antennas have radial magnetic near fields and straight linear antennas have circular magnetic near fields. The linear antennas have sufficient magnetic near field intensity for eddy current heating and straight shape makes them better candidates for installation in the geometries typical of hydrocarbon wells.

In summary various embodiments of the present invention provides a method for exciting RF heating underground formations using continuous conductive structures. Well pipes can be supplied with RF electrical currents without the need to break the pipes apart to form a conventional electrical driving discontinuity.

I claim:

1. An apparatus for heating a geologic hydrocarbon material within a subterranean formation comprising:
    a first conductive element extending into the subterranean formation adjacent the geologic hydrocarbon material;
    a second conductive element extending into the subterranean formation alongside said first conductive element and adjacent the geologic hydrocarbon material;
    a shunt element coupled between said first and second conductive elements;
    a magnetic core surrounding said shunt element;
    a radio frequency (RF) energy source; and
    an electrically conductive driving winding surrounding said magnetic core and coupled to said RF energy source.

2. The apparatus of claim 1, wherein said shunt element comprises an electrically conductive material.

3. The apparatus of claim 1, wherein said electrically conductive driving winding comprises a Litz wire.

4. The apparatus of claim 1, wherein said first and second conductive elements comprise first and second conductive pipes, respectively.

5. The apparatus of claim 1, wherein at least one of said first and second conductive elements extends through an overburden region of the subterranean formation; and wherein at least one of said first and second conductive elements further comprises an outer insulation that surrounds a section of said one of said first and second conductive elements that extends through the overburden region.

6. The apparatus of claim 5, wherein said at least one of said first and second conductive elements comprises a conductive coating adjacent said outer insulation.

7. The apparatus of claim 1, further comprising:
    an additional magnetic core surrounding one of said first and second conductive elements;
    an additional RF energy source; and
    an additional electrically conductive driving winding surrounding said additional magnetic core and coupled to said additional RF energy source.

8. The apparatus of claim 1, wherein said first and second conductive elements extend laterally within the subterranean formation.

9. An apparatus for heating a geologic hydrocarbon material within a subterranean formation comprising:
    a first conductive element extending into the subterranean formation adjacent the geologic hydrocarbon material;
    a first magnetic core surrounding said first conductive element;
    a first radio frequency (RF) energy source;
    a first electrically conductive driving winding surrounding said first magnetic core and coupled to said first RF energy source;
    a second conductive element extending into the subterranean formation alongside said first conductive element and adjacent the geologic hydrocarbon material;
    a second magnetic core surrounding said second conductive element;
    a second radio frequency (RF) energy source;
    a second electrically conductive driving winding surrounding said second magnetic core and coupled to said second RF energy source;
    a shunt element coupled between said first and second conductive elements;
    a third magnetic core surrounding said shunt element;
    a third radio frequency (RF) energy source; and
    a third electrically conductive driving winding surrounding said third magnetic core and coupled between said third RF energy source and said shunt element.

10. The apparatus of claim 9, wherein said shunt element comprises an electrically conductive material.

11. The apparatus of claim 9, wherein at least one of said first, second, and third electrically conductive driving windings comprises a Litz wire.

12. The apparatus of claim 9, wherein said first and second conductive elements comprise first and second conductive pipes, respectively.

13. A method of heating a geologic hydrocarbon material within a subterranean formation comprising:
    positioning a first conductive element to extend into the subterranean formation adjacent the geologic hydrocarbon material;
    positioning a second conductive element to extend into the subterranean formation alongside the first conductive element and adjacent the geologic hydrocarbon material;
    coupling a shunt element between the first and second conductive elements;
    positioning a magnetic core to surround the shunt element;
    positioning an electrically conductive driving winding to surround the magnetic core; and
    supplying RF energy to the electrically conductive driving winding.

14. The method of claim 13, wherein the shunt element comprises an electrically conductive material.

15. The method of claim 13, wherein the electrically conductive driving winding comprises a Litz wire.

* * * * *